(12) United States Patent
Kubo et al.

(10) Patent No.: US 11,269,936 B2
(45) Date of Patent: Mar. 8, 2022

(54) INFORMATION PROCESSING DEVICE AND INFORMATION PROCESSING METHOD

(71) Applicant: Toyota Jidosha Kabushiki Kaisha, Toyota (JP)

(72) Inventors: Chikage Kubo, Chofu (JP); Takuji Yamada, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/276,990

(22) Filed: Feb. 15, 2019

(65) Prior Publication Data

US 2019/0258657 A1 Aug. 22, 2019

(30) Foreign Application Priority Data

Feb. 20, 2018 (JP) .............................. JP2018-028223

(51) Int. Cl.
| | | |
|---|---|---|
| G10L 15/22 | (2006.01) | |
| G06F 16/332 | (2019.01) | |
| G06F 16/33 | (2019.01) | |
| G06N 5/02 | (2006.01) | |
| G06F 3/16 | (2006.01) | |
| H04W 4/48 | (2018.01) | |
| G06F 40/30 | (2020.01) | |
| G06F 40/289 | (2020.01) | |
| G06F 40/35 | (2020.01) | |
| G06F 40/295 | (2020.01) | |
| G06F 40/279 | (2020.01) | |

(52) U.S. Cl.
CPC .......... *G06F 16/3329* (2019.01); *G06F 3/167* (2013.01); *G06F 16/3344* (2019.01); *G06N 5/02* (2013.01); *G06F 40/279* (2020.01); *G06F 40/289* (2020.01); *G06F 40/295* (2020.01); *G06F 40/30* (2020.01); *G06F 40/35* (2020.01); *G10L 15/22* (2013.01); *G10L 2015/221* (2013.01); *H04W 4/48* (2018.02)

(58) Field of Classification Search
None
See application file for complete search history.

(56) References Cited

U.S. PATENT DOCUMENTS

| | | | | |
|---|---|---|---|---|
| 8,214,219 B2 * | 7/2012 | Prieto | ................... | B60N 2/002 704/275 |
| 8,645,143 B2 * | 2/2014 | Mozer | .......................... | 704/275 |
| 8,660,735 B2 * | 2/2014 | Tengler | .............. | G06K 9/00845 701/24 |
| 9,397,770 B2 * | 7/2016 | Smereka | ............. | H04W 72/005 |

(Continued)

FOREIGN PATENT DOCUMENTS

| | | |
|---|---|---|
| JP | 2004333543 A | 11/2004 |
| JP | 2005147925 A | 6/2005 |

(Continued)

*Primary Examiner* — Richard Z Zhu

(74) *Attorney, Agent, or Firm* — Dinsmore & Shohl LLP

(57) ABSTRACT

An information processing device includes a processor. The processor is configured to: receive an input of a question; hold a response, when data required to output response content in response to the question is insufficient; and output, when insufficient data is collected while the response is being held, an announcement that the response is made and the response content.

8 Claims, 3 Drawing Sheets

(56) References Cited

U.S. PATENT DOCUMENTS

| | | | | |
|---|---|---|---|---|
| 2001/0047262 | A1* | 11/2001 | Kurganov | G10L 15/193 704/270.1 |
| 2003/0167167 | A1* | 9/2003 | Gong | G10L 15/22 704/250 |
| 2005/0080632 | A1* | 4/2005 | Endo | G10L 15/08 704/277 |
| 2006/0161440 | A1* | 7/2006 | Nakayama | B60R 16/0373 704/270 |
| 2013/0158778 | A1* | 6/2013 | Tengler | G06K 9/00845 701/31.5 |
| 2014/0195226 | A1* | 7/2014 | Yun | G10L 15/01 704/231 |
| 2015/0142704 | A1* | 5/2015 | London | G06N 5/022 706/11 |
| 2015/0149931 | A1* | 5/2015 | Yamada | G06F 3/04842 715/753 |
| 2016/0110347 | A1* | 4/2016 | Kennewick, Jr | G06F 16/3329 704/9 |
| 2016/0342694 | A1* | 11/2016 | Allen | H04L 67/22 |
| 2019/0003848 | A1* | 1/2019 | Hoten | G01C 21/3644 |
| 2019/0178761 | A1* | 6/2019 | Lindsey | G01N 1/286 |
| 2020/0191592 | A1* | 6/2020 | Uno | G01C 21/3605 |
| 2021/0225381 | A1 | 7/2021 | Nagasaka | |

FOREIGN PATENT DOCUMENTS

| | | | |
|---|---|---|---|
| JP | 2014191030 A | 10/2014 | |
| JP | 2017107078 A | 6/2017 | |
| JP | 2017-157117 A | 9/2017 | |

* cited by examiner

INFORMATION PROCESSING DEVICE AND INFORMATION PROCESSING METHOD

CROSS-REFERENCE TO RELATED APPLICATION

This application claims priority to Japanese Patent Application No. 2018-028223 filed on Feb. 20, 2018, incorporated herein by reference in its entirety.

BACKGROUND

1. Technical Field

The present disclosure relates to an information processing device and an information processing method.

2. Description of Related Art

There is known a voice interaction device that generates and outputs a fixed first response sentence in response to a speech of the user and, in parallel with the output of the first response sentence, generates a second response sentence that is a substantial reply to the speech. After the completion of the output of the first response sentence, the voice interaction device outputs the generated second response sentence (see, for example, Japanese Patent Application Publication No. 2017-107078 (JP 2017-107078 A)).

SUMMARY

The technique described above works on the premise that the first response sentence and the second response sentence are output continuously. Therefore, the user expects that the second response sentence will be output immediately after first response sentence is output. This means that, when it takes long to generate the second response sentence, it takes time before outputting the second response sentence with the possibility that the user will feel uncomfortable.

The present disclosure provides an information processing device and an information processing method for reducing the possibility that the user will feel uncomfortable when response content is output in response to a user's question.

A first aspect of the disclosure provides an information processing device. The information processing device includes a processor configured to: receive an input of a question; hold a response, when data required to output response content in response to the question is insufficient; and output, when insufficient data is collected while the response is being held, an announcement that the response is made and the response content.

According to this aspect, if required data is insufficient, the information processing device holds the response and, if data is collected while the response is being held, the information processing device outputs the response announcement message and the response content. Therefore, even if it takes time before the response content is output, the information processing device allows the user to recognize that the response will be output and, after that, outputs the response content. This reduces the possibility that the user will feel uncomfortable.

A second aspect of the disclosure provides an information processing method. The information processing method includes: receiving an input of a question; holding a response, when data required to output response content in response to the question is insufficient; and outputting, when insufficient data is collected while the response is being held, an announcement that the response is made and the response content.

According to this disclosure, the information processing device and the information processing method reduce the possibility that the user will feel uncomfortable when response content is output in response to a user's question.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
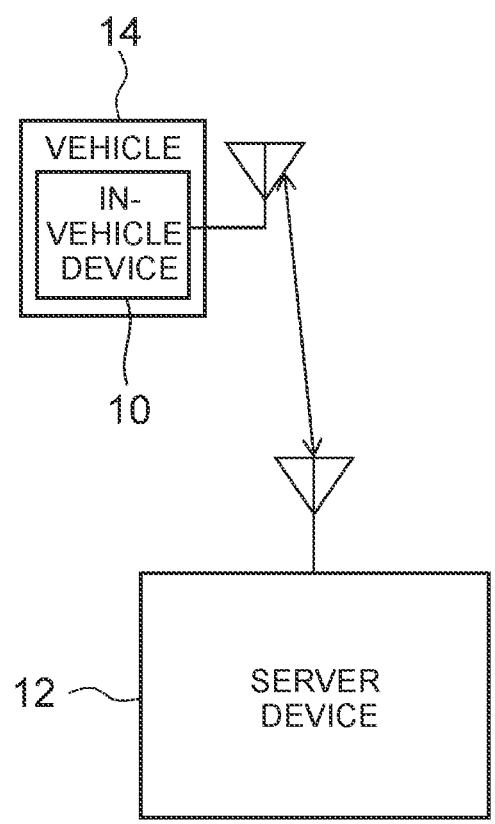
FIG. 1 is a block diagram showing a configuration of a vehicle system according to an embodiment.

FIG. 1 is a block diagram showing a configuration of a vehicle system 1 according to an embodiment. The vehicle system 1 includes an in-vehicle device 10 and a server device 12. The vehicle system 1 may also be referred to as an information processing system. The vehicle system 1, which includes one in-vehicle device 10 in FIG. 1 for the sake of description, may include a plurality of in-vehicle devices 10.

The in-vehicle device 10 is mounted on a vehicle 14 that is an automobile. The in-vehicle device 10 wirelessly communicates with the server device 12. The wireless communication standard is, for example, 3G (third generation mobile communication system), 4G (4th generation mobile communication system), or 5G (fifth generation mobile communication system) though not limited to it. The in-vehicle device 10 may wirelessly communicate with the server device 12 via a base station not shown. The server device 12 is installed, for example, in a data center.

Figure 2:
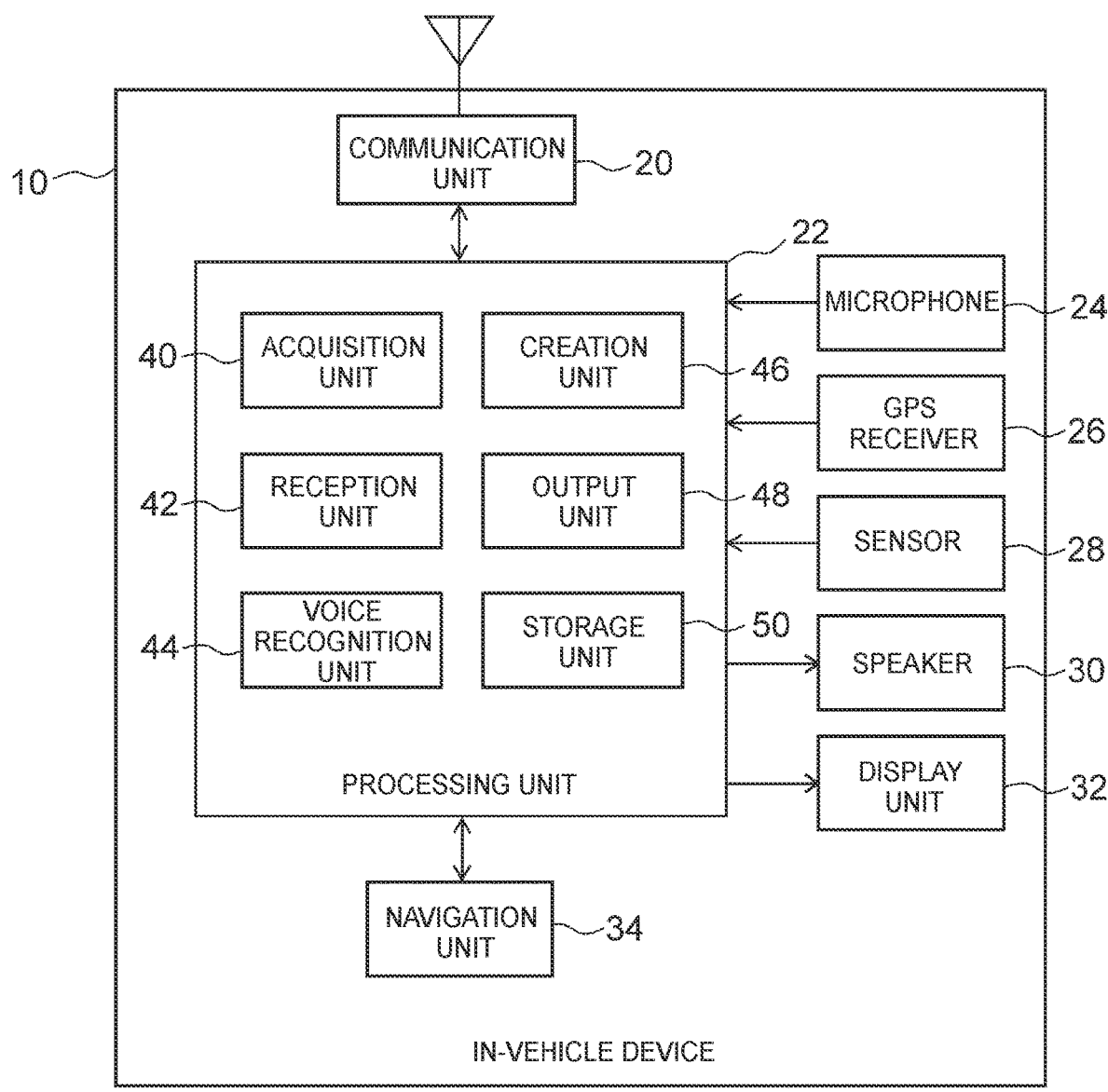
FIG. 2 is a block diagram showing a configuration of the in-vehicle device shown in FIG. 1.

FIG. 2 is a block diagram showing a configuration of the in-vehicle device 10 shown in FIG. 1. The in-vehicle device 10 includes a communication unit 20, a processing unit 22, a microphone 24, a GPS receiver 26, a sensor 28, a speaker 30, a display unit 32, and a navigation unit 34.

The microphone 24, provided in the vehicle interior of the vehicle 14, acquires voice in the vehicle interior. This voice includes the speech of a question asked by an occupant (user) of the vehicle 14. The microphone 24 outputs the acquired voice data to the processing unit 22.

The GPS receiver 26 receives signals from the GPS satellites and derives the position of the vehicle 14. The position of the vehicle 14 includes latitude and longitude. The GPS receiver 26 outputs the position information on the vehicle 14 to the processing unit 22.

The sensor 28 detects various types of vehicle information on the vehicle 14. The vehicle information includes, for example, the information whether the ignition switch is on or off. The sensor 28 outputs the detected vehicle information to the processing unit 22.

The speaker 30, provided in the vehicle interior of the vehicle 14, is a voice output device that outputs voice. The display unit 32, a display device such as a liquid crystal display, is provided on the center console or the dashboard of the vehicle 14. The navigation unit 34 provides driving guidance according to a suggested route to the destination that is set. The navigation unit 34 outputs the destination information and the suggested route information to the processing unit 22.

The processing unit 22 includes an acquisition unit 40, a reception unit 42, a voice recognition unit 44, a creation unit 46, an output unit 48, and a storage unit 50. The processing unit 22 functions as an information processing device. The processing unit 22 may also be referred to as an agent (interactive device) that outputs response content in response to a question asked by user's voice.

The acquisition unit 40 periodically acquires the vehicle information on the host vehicle from the sensor 28. The acquisition unit 40 periodically acquires the position information on the host vehicle from the GPS receiver 26. The acquisition unit 40 acquires the destination information and the suggested route information from the navigation unit 34. The acquisition unit 40 outputs the vehicle information, position information, destination information, and suggested route information to the creation unit 46.

The reception unit 42 receives voice data from the microphone 24. This means that the reception unit 42 receives an input of a user's question. The reception unit 42 outputs the received voice data to the voice recognition unit 44.

The voice recognition unit 44 recognizes voice spoken by the user based on the voice data that is output from the reception unit 42. Voice can be recognized using a known technique. The voice recognition unit 44 outputs the voice recognition result to the creation unit 46. The voice recognition result includes text data.

The creation unit 46 creates response content to be retuned in response to voice spoken by the user based on the voice recognition result recognized by the voice recognition unit 44. For example, the creation unit 46 parses the text data of the voice recognition result and semantically interprets the character string information. The creation unit 46 identifies data, necessary for creating response content to be retuned in response to a question received by the reception unit 42 (in the description below, this data is also referred to as required-for-response data), based on the analysis result of the character string information and the information output from the acquisition unit 40. Required-for-response data is data to be included in response content. If data is unnecessary for creating response content, the creation unit 46 creates the response content without using data. Response content can be created using a known technique.

The creation unit 46 acquires required-for-response data from the storage unit 50. The storage unit 50 stores data of a predetermined type, for example, map data used by the navigation unit 34, various information acquired by the acquisition unit 40, and so on. The map data may be stored, not in the storage unit 50, but in the server device 12.

If required-for-response data is not stored in the storage unit 50, the creation unit 46 fails to acquire the required-for-response data from the storage unit 50. If required-for-response data cannot be acquired from the storage unit 50, the creation unit 46 outputs a request for required-for-response data to the communication unit 20 to acquire it from the server device 12.

For example, if the user's question is "I want to see the traffic jam situation near the destination", the creation unit 46 identifies that the required-for-response data is the current image data on the area near the destination of the suggested route that is set in the navigation unit 34. This image data cannot be acquired from the storage unit 50 because the storage unit 50 does not store image data on a specific position. Therefore, in this case, the creation unit 46 outputs a data request to the communication unit 20 as described above to obtain the image data on the area near the destination of the suggested route.

The communication unit 20 wirelessly communicates with the server device 12. The communication unit 20 sends a data request, output from the creation unit 46, to the server device 12. To this data request, the information for identifying the vehicle 14, which is the sending source, is attached.

The server device 12 wirelessly communicates with the communication unit 20 of the in-vehicle device 10, The server device 12 receives a data request from the communication unit 20 of the in-vehicle device 10. The server device 12 acquires the data, corresponding to the received data request, from its own database, from the in-vehicle devices of a plurality of vehicles, or from the other server devices. In some cases, the server device 12 fails to acquire data requested by a data request because there is no data corresponding to the data request or because the server device 12 cannot communicate with the in-vehicle device of a vehicle.

In the example of the question above, the server device 12 acquires the image data on the area near the destination of the suggested route from a vehicle traveling near the destination, which is capable of acquiring the data, in response to the data request. If there is no vehicle capable of acquiring the data on the area near the destination, the server device 12 cannot acquire the image data on the area near the destination.

If the data requested by the data request is acquired, the server device 12 sends the acquired data to the in-vehicle device 10. To this data, the information for identifying the vehicle 14, which is the sending destination, is attached.

The communication unit 20 receives the data sent from the server device 12 to the host vehicle. The communication unit 20 outputs the received data to the creation unit 46.

When the data required to create response content is collected, the creation unit 46 creates the response content to be retuned in response to the question based on the data acquired from the storage unit 50 or the data output from the communication unit 20, and supplies the created response content to the output unit 48. The response content includes text information. The response content may include image information.

The output unit 48 outputs the response content, supplied from the creation unit 46, via the speaker 30 and the display unit 32. More specifically, the output unit 48 converts the text information, included in the supplied response content, into a voice signal and outputs the voice signal to the speaker 30. The output unit 48 generates an image signal from the text information and the image information, included in the supplied response content, and outputs the generated image signal to the display unit 32.

The speaker 30 outputs the response content via voice based on the voice signal output from the output unit 48. The display unit 32 displays the response content using characters or images based on the image signal output from the output unit 48.

On the other hand, if the creation unit 46 has failed to acquire the required-for-response data from the storage unit 50 and from the server device 12, the required-for-response data is insufficient. If the required-for-response data is insufficient, the creation unit 46 supplies the response-holding information to the output unit 48.

If the response holding information is supplied from the creation unit 46, that is, if the data required to output the response content is insufficient, the output unit 48 outputs the response holding message via the speaker 30 and the display unit 32 and then holds the response. An example of the response holding message is predetermined text information such as "Response is held because data for the response is insufficient".

If the required-for-response data is insufficient, the creation unit 46 memorizes the data acquisition task and periodically acquires the required-for-response data from the storage unit 50 or the server device 12. Even while the creation unit 46 is periodically acquiring the required-for-response data according to the memorized data acquisition task, the reception unit 42 can accept an input of a new question from the user and the output unit 48 can output response content in response to the new question. The creation unit 46 can memorize a plurality of data acquisition tasks.

If the insufficient data is collected while the response is being held, the creation unit 46 creates response content based on the data acquired from the storage unit 50 or the data output from the communication unit 20. Then, the creation unit 46 supplies the response resuming information and the created response content to the output unit 48.

If the response resuming information and the response content are supplied from the creation unit 46, that is, if the insufficient data is collected while the response is being held, the output unit 48 outputs the response announcement message and the response content for the question, for which the response has been held, via the speaker 30 and the display unit 32. An example of the response announcement message is predetermined text information such as "Responding to the question asked earlier" or "Responding to the question asked yesterday" that includes the information on the time at which the question, for which the response has been held, was asked.

In the above example, the question is "I want to see the traffic jam situation near the destination". In this example, if at first there is no vehicle capable of acquiring data on the area near the destination and, after an elapse of time, there is one vehicle capable of acquiring data on the area near the destination, the server device 12 can acquire image data on the area near the destination from that vehicle in response to the data request that was sent from the creation unit 46 via the communication unit 20. Then, from the server device 12, the creation unit 46 acquires the image data on the area near the destination and creates response content that includes the text information such as "Road status near the destination is displayed on the display" and the image information on the area near the destination. The output unit 48 outputs the response announcement message and then outputs the response content.

Next, another example will be described. When the user's question is "Teach a nearby Italian restaurant", the creation unit 46 identifies that the required-for-response data is data on an Italian restaurant within a predetermined distance from the current position. The predetermined distance is, for example, 10 kilometers.

If there is no Italian restaurant within a predetermined distance from the current position, the creation unit 46 cannot acquire data on an Italian restaurant within a predetermined distance from the current position from the storage unit 50 and the server device 12. Therefore, the output unit 48 outputs the response holding message and holds the response.

As the vehicle 14 keeps moving and arrives at a position where an Italian restaurant is present within a predetermined distance from the current position, the creation unit 46 can acquire data on the Italian restaurant within the predetermined distance from the current position from the storage unit 50. Such data is included in the map data stored in the storage unit 50. The output unit 48 outputs the response announcement message, followed by response content such as "There is an Italian restaurant called ABCD about 10 kilometers ahead".

Next, still another example will be described. Even when the communication between the in-vehicle device 10 and the server device 12 cannot be carried out due to a problem with the communication environment and the creation unit 46 has failed to acquire data, the output unit 48 outputs the response holding message and holds the response. After that, when the communication between the in-vehicle device 10 and the server device 12 is recovered and the data that has been insufficient in the response holding state is collected, the output unit 48 outputs the response announcement message and then outputs the response content.

Next, the processing for stopping the creation of response content will be described. If a predetermined response stop condition is satisfied while a response is being held by the output unit 48, the creation unit 46 erases the data acquisition task, stops acquiring data from the storage unit 50, stops sending the data request to the server device 12, and stops creating the response content. The output unit 48 stops outputting the response content if the response stop condition is satisfied while the response is being held.

The response stop condition is satisfied when (1) the reception unit 42 has accepted an input of a question withdrawal request from the user or (2) the reception unit 42 has accepted an input of a question change request from the user. These conditions are common to all questions.

The response stop condition may further include conditions different according to each question. In this case, the creation unit 46 may set a response stop condition based on the analysis result of the character string information included in the question or the response stop condition may be prepared in advance for each of assumed questions.

For example, when the user's question is "I want to see the traffic jam situation near the destination" as described above, the response stop condition is the condition (1) given above, the condition (2) given above, or (3) the host vehicle has arrived at a predetermined position. The predetermined position is a position near the destination, a position on the road where the traffic is congested, or a position on the road circumventing the traffic jam. When the host vehicle arrives at one of those positions, there is a possibility that the response is unnecessary.

When the user's question is "Teach a nearby Italian restaurant", the response stop condition is the condition (1) given above, the condition (2) given above, (3) a predetermined first period has elapsed since the reception unit 42 received the input of the question, or (4) the host vehicle has been at a place similar to the place specified by the question, with the ignition switch turned off for a predetermined second period. The first period and the second period may be appropriately determined by experiments. For example, the first period is around 3 hours. If the first period has elapsed since the question was asked, the user may already have finished the meal and there is a possibility that the response is unnecessary. The second period is the time required for a meal. For example, if the ignition switch has been turned off for the second period at the position of an eating place similar to the Italian restaurant specified by the question, the user may have had a meal at this place and the response may be unnecessary.

The configuration of this embodiment can be implemented by the Central Processing Unit (CPU), memory, and other Large-Scale Integration (LSI) of a computer on a hardware basis, and by a program loaded in the memory on a software basis. The function of the processing unit may be executed by any processor. FIG. 2 illustrates the functional blocks implemented through cooperation of hardware and software. Therefore, it is to be understood by those skilled in the art that these functional blocks can be implemented in various forms by hardware only, by software only, or by a combination of hardware and software.

Figure 3:
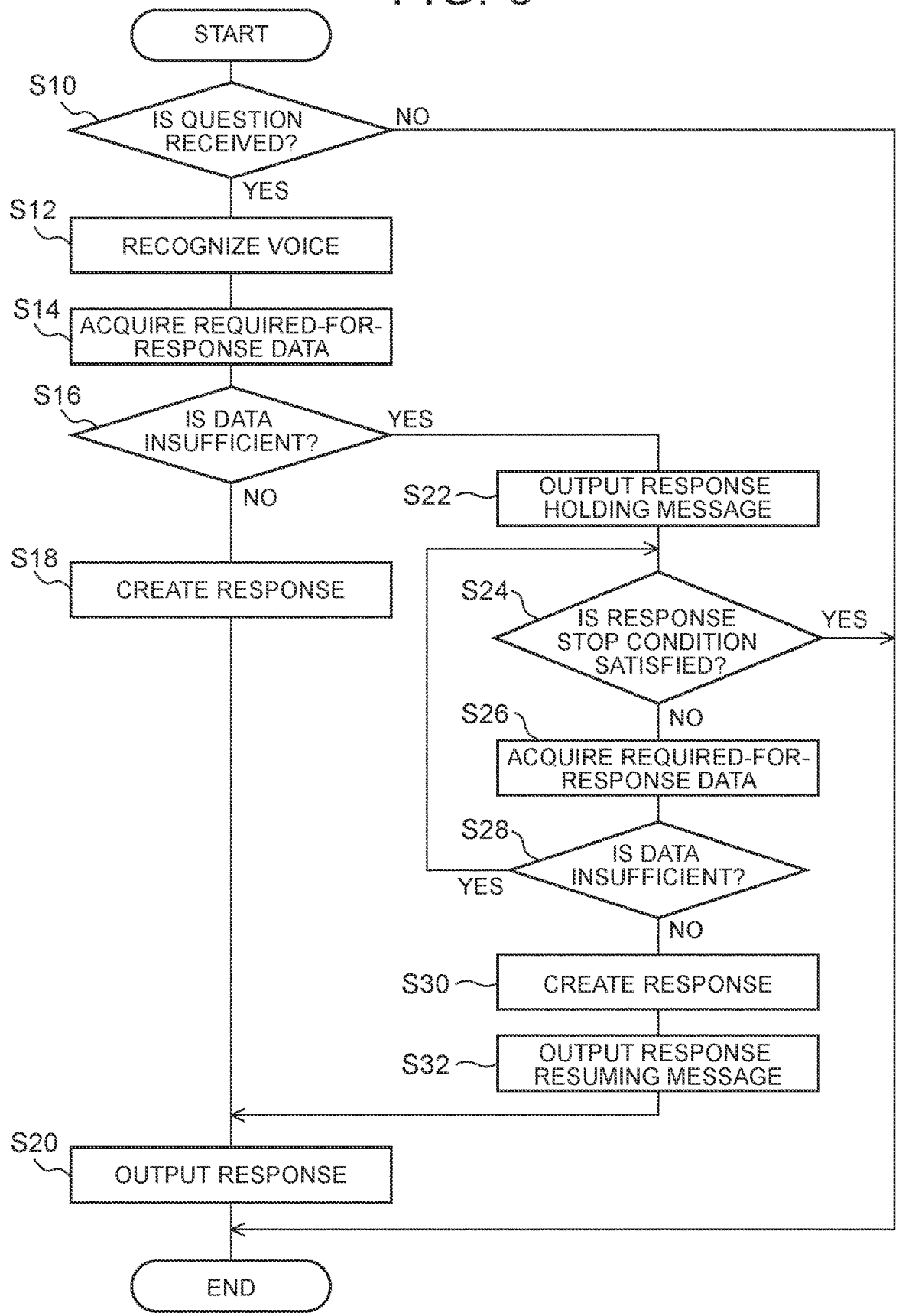
FIG. 3 is a flowchart showing the processing of the processing unit shown in FIG. 2.

Next, the overall operation of the vehicle system 1 with the above configuration will be described. FIG. 3 is a flowchart showing the processing of the processing unit 22 shown in FIG. 1. The processing in FIG. 3 is performed when data is required for creating response content. This processing is repeated periodically.

If the reception unit 42 does not receive an input of a question (N in S10), the processing is terminated. If the reception unit 42 receives an input of a question (Y in S10), the voice recognition unit 44 recognizes the voice (S12) and the creation unit 46 acquires required-for-response data based on the voice recognition result (S14). If the required-for-response data is not insufficient (N in S16), the creation unit 46 creates response content (S18) and the output unit 48 outputs the response content (S20).

If the required-for-response data is insufficient (Y in S16), the output unit 48 outputs a response holding message (S22) and, if the response stop condition is satisfied (Y in S24), terminates the processing. If the response stop condition is not satisfied (N in S24), the creation unit 46 acquires the required-for-response data (S26), and, if the required-for-response data is insufficient (Y in S28), the processing returns to step S24. If the required-for-response data is not insufficient (N in S28), the creation unit 46 creates response content (S30), the output unit 48 outputs the response announcement message (S32), and the processing proceeds to step S20.

As described above, this embodiment holds the response if data necessary for outputting response content is insufficient and, if the insufficient data is collected while the response is being held, outputs the response announcement message and the response content. Therefore, even when it takes long before response content is output, this embodiment allows the user to recognize in advance that the response will be given and, after that, outputs the response content, thus reducing the possibility that the user will feel uncomfortable.

In addition, if data necessary for outputting response content is insufficient, this embodiment outputs the response holding message, allowing the user to easily recognize that the response is held. Therefore, even when the response content is not output immediately, this embodiment allows the user to recognize that the question has been accepted, reducing the possibility that the user will ask the same question again.

If data is collected several hours or one or more days after the user asked a question and then the response content is output, this embodiment allows the user to acquire the response content without asking the same question many times before the data is collected. In some cases, the user forgets that he or she asked a question; even in that case, this embodiment is convenient because the user can acquire information in which he or she was interested at the time of questioning.

If a response stop condition is satisfied while a response is being held, this embodiment stops the output of the response content and, therefore, prevents the response content, which may be unnecessary anymore for the user, from being output. This reduces the possibility that the user will feel annoying.

The present disclosure has been described above based on the embodiment. Note that the embodiment is merely an example. It is to be understood by those skilled in the art that various modifications are possible by combining the components and processing processes and that such modifications are also within the scope of the present disclosure.

(First Modification)

If data required to output response content is insufficient, the output unit 48 may hold the response without outputting the response holding message. In the situation in which the response stop condition is satisfied while the data necessary for outputting the response content is not yet collected and, as a result, the output of the response is stopped, this modification prevents the user from expecting needlessly that the response will be output.

(Second Modification)

If required-for-response data is insufficient, the creation unit 46 may supply the information identifying the insufficient data to the output unit 48. If data required to output the response content is insufficient, the output unit 48 may output the information that identifies the insufficient data and that is supplied from the creation unit 46. Even if the response content is not output immediately, this modification allows the user to recognize that the question has been accepted and whether the question has been properly accepted.

(Third Modification)

If insufficient data is collected while the response is being held, the creation unit 46 may supply the information identifying the question, to which the response has been held, to the output unit 48. If the insufficient data is collected while the response is being held, the output unit 48 may output the information identifying the question to which the response has been held. The information identifying the question to which the response has been held may be included in the response announcement message. This modification allows the user to easily recognize to what question the response content has been output when the time from question to response becomes relatively long.

(Fourth Modification)

If the required-for-response data is insufficient, the creation unit 46 may supply a predicted time to response to the output unit 48. If the data required to output the response content is insufficient, the output unit 48 may output the predicted time to response. For example, when the user's question is "I want to see the traffic jam situation near the destination", the creation unit 46 selects a vehicle that is nearest to the destination from among the vehicles that are traveling towards the destination and that can acquire the data. Then, the creation unit 46 acquires, from the server device 12, the time predicted for the selected vehicle to arrive at the destination and determines the acquired predicted time as the predicted time to response. This modification allows the user to recognize an indication of the time until the response content is output, improving the convenience of the user.

(Fifth Modification)

If the response stop condition is satisfied while the response is being held, the output unit 48 may output the information confirming whether to stop the response. After that, if the reception unit 42 accepts an input of a user's approval to stop the output of the response, the output unit 48 may stop the output of the response content. This modification can prevent an unintended user's request to stop.

At least two of the first modification to the fifth modification may be combined.

The in-vehicle device 10 has been described as an example. The in-vehicle device 10 may be configured as a smartphone, a personal computer, or the like that is not mounted on the vehicle.

The communication unit 20 may carry out inter-vehicle communication with other vehicles for acquiring required-for-response data from the agents of other vehicles.

What is claimed is:

1. An information processing device of a vehicle, the information processing device comprising a processor configured to:
   receive an input of a question searching for an entity within a certain distance of the vehicle;
   determine whether the entity is within the certain distance of the vehicle;
   hold a response in response to determination that the entity is not within the certain distance of the vehicle;
   continue searching for the entity within the certain distance of the vehicle while the vehicle is moving; and
   output, upon determination that the entity becomes within the certain distance of the vehicle, an announcement mentioning the question for which the response is going to be provided and response content including information about the entity.

2. The information processing device according to claim 1, wherein
   the processor is configured to output, in response to determination that the entity is not within the certain distance of the vehicle, an announcement that the response is hold.

3. The information processing device according to claim 1, wherein
   the information about the entity includes a distance from the vehicle to the entity.

4. The information processing device according to claim 1, wherein
   the processor is configured to stop, when a predetermined response stop condition is satisfied while the response is being held, an output of the response content.

5. The information processing device according to claim 1, wherein
   the processor is configured to output, in response to determination that the entity is not within the certain distance of the vehicle, a predicted time to response.

6. The information processing device according to claim 1, wherein the announcement mentioning the question includes information about when the question was asked.

7. An information processing method comprising:
   receiving an input of a question searching for an entity within a certain distance of a vehicle;
   determining whether the entity is within the certain distance of the vehicle;
   holding a response in response to determination that the entity is not within the certain distance of the vehicle;
   continue searching for the entity within the certain distance of the vehicle while the vehicle is moving; and
   outputting, upon determination that the entity becomes within the certain distance of the vehicle, an announcement mentioning the question for which the response is going to be provided and response content including information about the entity.

8. The information processing method according to claim 7, wherein the announcement mentioning the question includes information about when the question was asked.

* * * * *